UNITED STATES PATENT OFFICE.

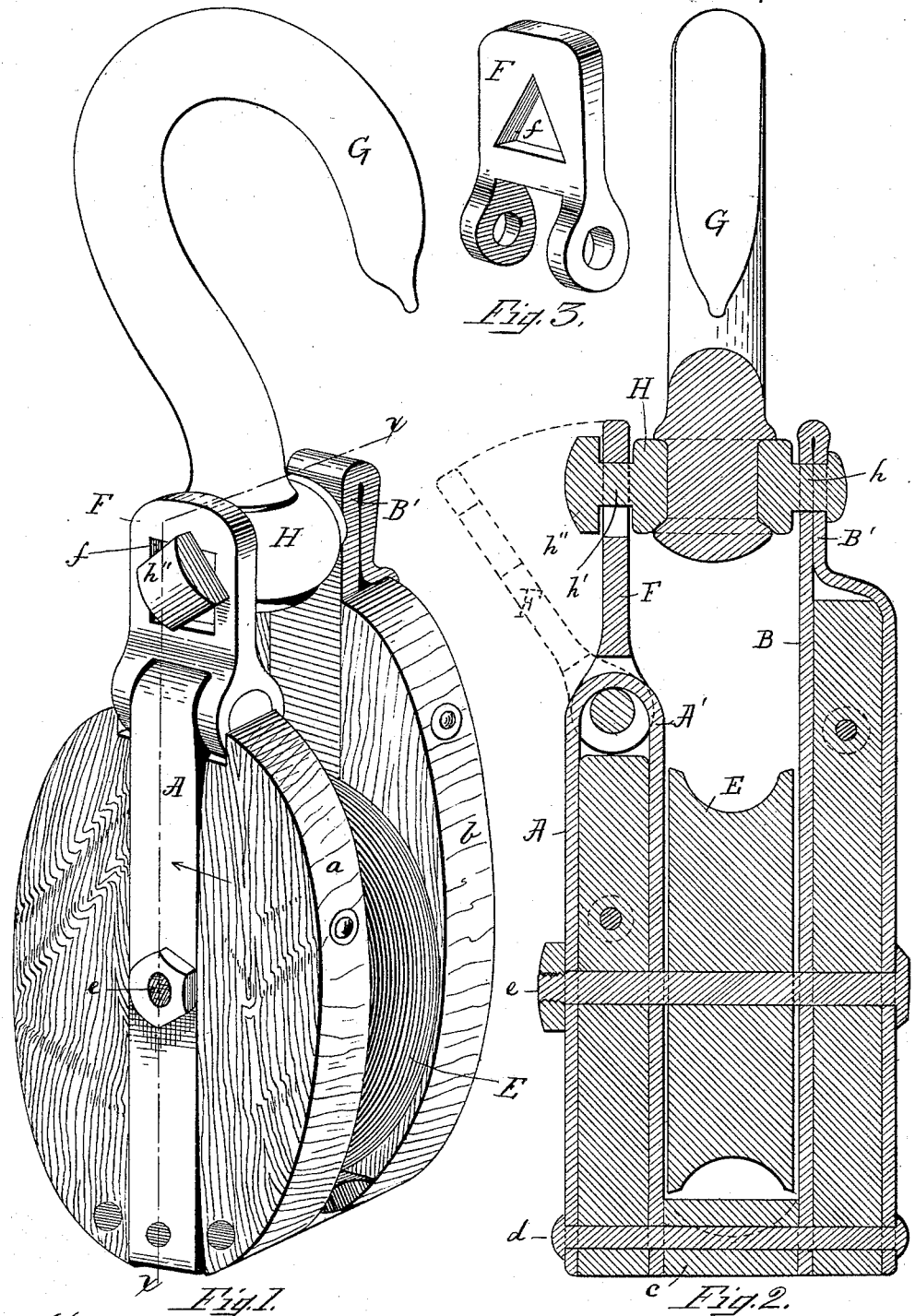

THOMAS R. FERRALL, OF BOSTON, MASSACHUSETTS, ASSIGNOR TO THE BOSTON & LOCKPORT BLOCK COMPANY, OF NEW JERSEY.

SNATCH-BLOCK.

SPECIFICATION forming part of Letters Patent No. 430,519, dated June 17, 1890.

Application filed January 29, 1890. Serial No. 338,486. (No model.)

*To all whom it may concern:*

Be it known that I, THOMAS R. FERRALL, a citizen of the United States, and a resident of Boston, in the county of Suffolk and State of Massachusetts, have invented new and useful Improvements in Snatch-Blocks, of which the following, taken in connection with the accompanying drawings, is a specification.

This invention relates to improvements in snatch-blocks, and it is carried out as follows, reference being had to the accompanying drawings, wherein—

Figure 1 represents a perspective view of the improved snatch-block shown in a working position. Fig. 2 represents a vertical section on the line X X shown in Fig. 1, and Fig. 3 represents a modified form of the pivoted locking-link.

Similar letters refer to similar parts wherever they occur on the different parts of the drawings.

$a$ and $b$ represent, respectively, the cheek-pieces, which may be made of wood or metal, as is common in blocks of this kind.

$c$ is the end piece secured to and between the lower ends of the cheek-pieces $a$ $b$, as usual.

A is a bow-strap passing downward on the in and out sides of the cheek-piece $a$ and having a loop or eye A', as usual. B is a similar bow-strap passing downward on the in and out side of the cheek-piece $a$, said bow-strap having its upper end flattened and closed together, as shown at B' in Figs. 1 and 2.

$d$ is a bolt or rivet as usual passing through the lower ends of the bow-straps A B, their cheeks $a$ $b$, and the end piece $c$, as shown in Fig. 2.

E is the sheave loosely journaled on the spindle $e$, that passes through the bow-straps A B, cheek-pieces $a$ $b$, and said sheave E, as shown in Fig. 2.

To the eye or bend A' of the bow-strap A is pivoted the lower end of the link F, having a polygonal perforation $f$ through its upper end, as shown in the drawings. In practice I prefer to make said perforation $f$ four-sided, as shown in Fig. 1; but this is not essential, as it may be of the form shown in Fig. 3, or other polygonal shape, without departing from the essence of my invention.

G is the hook or bail having its shank loosely journaled in a vertical perforation in the head or cross-bar H and having its lower end headed, so as to prevent it from getting detached from said head H, as usual in blocks of this kind. The head H has in one of its ends a cylindrical trunnion $h$ passing loosely through a perforation in the flattened upper portion B' of the bow-strap B, to enable the head H to be turned a part of a revolution around its axis in locking or unlocking it from the perforated link F. The trunnion $h$ is headed in its outer end to prevent its getting detached from the bow-strap portion B', as shown in Fig. 2. In its opposite end the head H has a trunnion $h'$, terminating as a polygonal locking projection $h''$, of a shape corresponding to the perforation $f$ in the link F, but slightly smaller than the said perforation $f$, so as to permit said projection $h''$ to pass through the perforation $f$ when the head or cross-bar H is turned slightly around its axis. The projection $h''$ is arranged on the head H in such a manner relative to the perforation in the link F that the corners of the said projections $h''$ are caused to project outside of the sides of the polygonal perforation $f$, and have a series of bearings on the outside of the link adjacent to said perforation when the hook or bail G is in the working position relative to the block, as shown in Fig. 1, thus preventing the said link F from getting detached from the head H while the block is in use. This construction and relative arrangement of the polygonal locking projection $h''$ and corresponding perforation $f$, whereby the said locking projection is enabled to have a series of bearings on the outside of the link, is the distinguishing characteristic of my present invention, and furnishes a more secure and reliable lock than is possible with those forms of construction in which the locking projection has only a single bearing on the outside of the pivoted link. It is obvious that the polygonal locking projection $h''$, with its series of bearings on the outer face of the link, will effectually prevent accidental disengagement of the said link and polygonal projection under any lateral strain to which the snatch-block may be subjected while in use, and which would be liable to cause displacement of said parts when engaged at a single point only.

By making the link perforation $f$ square or rectangular in shape and the projection $h''$ correspondingly it is only necessary to turn the head H one-eighth of a revolution around its axis to unlock the said head from the link F or to lock it thereto, as the case may be, and this is very advantageous, as it enables the person in charge to close or open the block with the greatest ease and in a very short space of time for the purpose of placing a rope on the sheave or removing it therefrom.

If the various parts of the block are in the respective positions shown in Figs. 1 and 2, and it is desired to place a rope on the sheave E, it is only necessary to turn the head H one-eighth of a revolution around its axis, (if the perforation $f$ and projection $h''$ are four-sided,) causing the sides of the projection $h''$ and perforation $f$ to coincide, when the link $f$ may be swung outward, as shown in dotted lines in Fig. 2. After the rope is placed on the sheave within the block the link F is swung back to its normal position and the head or cross-bar H with its hook or bail G is then returned to its normal working position, (shown in Figs. 1 and 2,) by which the link F is locked to the said head H and its projection $h''$.

I would have it understood that I do not herein claim the construction shown in Letters Patent heretofore granted to me, No. 235,222, dated December 7, 1880, and No. 243,034, dated June 14, 1881, my present invention being distinguished therefrom in that it relates only to a snatch-block in which the locking projection and the link perforation are of corresponding polygonal form, so that said locking projection will have a series of bearings on the outside of the link when the block and its hook or bail are in normal position.

Having thus fully described the nature, construction, and operation of my invention, I wish to secure by Letters Patent and claim—

In a snatch-block, the combination, with the straps A B and hook or bail G, of the head or cross-bar A, connected with said hook and having one end journaled in the strap B, and the other end provided with a trunnion $h'$ terminating in a polygonal locking projection $h''$, and the link F, pivoted to the strap A and having a polygonal perforation $f$ for passage over the polygonal locking projection $h''$, said perforation and projection being relatively so arranged as to afford a series of bearings for the corners of the locking projection on the outside of the link adjacent to said perforation when the block and its hook or bail are in normal operative position, substantially as and for the purpose set forth.

In testimony whereof I have signed my name to this specification, in the presence of two subscribing witnesses, on this 24th day of January, A. D. 1890.

THOMAS R. FERRALL.

Witnesses:
ALBAN ANDRÉN,
M. J. JACKSON.